(12) United States Patent
Eftink

(10) Patent No.: US 6,370,547 B1
(45) Date of Patent: Apr. 9, 2002

(54) DATABASE CORRELATION METHOD

(75) Inventor: Marion J. Eftink, Spring, TX (US)

(73) Assignee: Union Oil Company of California, El Segundo, CA (US)

( * ) Notice: Subject to any disclaimer, the term of this patent is extended or adjusted under 35 U.S.C. 154(b) by 0 days.

(21) Appl. No.: 09/296,023

(22) Filed: Apr. 21, 1999

(51) Int. Cl.[7] .............................................. G06F 17/30
(52) U.S. Cl. ........................ 707/201; 707/10; 709/201; 703/3; 702/9
(58) Field of Search ................................ 707/101, 104, 707/201, 200, 10; 175/24; 73/432; 324/323, 326; 367/345–359, 25; 702/9, 13; 703/3–10

(56) References Cited

U.S. PATENT DOCUMENTS

| | | | |
|---|---|---|---|
| 4,794,534 A | * 12/1988 | Millheim | 702/9 |
| 5,978,771 A | * 11/1999 | Vandivier, III | 705/8 |

OTHER PUBLICATIONS

Query Optimization in the ADDS multidatabase system; Reyes, T. et al.; Applied Computing, Apr. 1990.*
"Houston Hosts Intensive Data Management Week," PDM Petroleum Data Management, May 1998, p. 4.
"Knowledge Management in the E&P Marketplace Multiplying the Value of Information," HART Information Technology Solutions, Hart's E&P Oil and Gas Investor, Oct. 2000, pp. 13–15.

Landgren, Ken, "Data Management Vital for Integrated E&P Interpretation," E&P Data Management Conference, Houston, Texas, Sep. 10–11, 1996, pp. 1–5.
Kilpatrick, Paul, "A Tool Kit Approach to Building an Exploration Information Management System and the Management of Metadata," Marathon Oil Company, Exploration Services, Houston, Texas, Sep. 10–11, 1996, pp. 1–6.
Eberhardt, J. et al., "Managing Distributed Exploration Databases," 2nd Annual International Conference on Petroleum Data Integration and Management, Houston, Texas, Apr. 22, 1998.

* cited by examiner

Primary Examiner—Hosain T. Alam
Assistant Examiner—Jean Bolte Fleurantin
(74) Attorney, Agent, or Firm—William O. Jacobson; Gregory F. Wirzbicki

(57) ABSTRACT

A multi-pass algorithm identifies duplicative information and correlates higher confidence and/or selected primary information in distributed databases. One embodiment determines a bounded area based at least in part on location information and/or location tolerances for a location-dependent attribute and comparing the bounded areas to previously indexed location information using a multi-pass algorithm to identify duplicative information. The algorithm may also use textual tolerances, confidence levels, and other factors to determine what information is to be correlated with the option of elevating the correlated information to a higher level database.

29 Claims, 5 Drawing Sheets

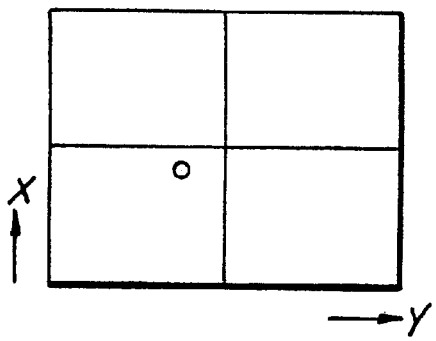
_Fig. 2b._
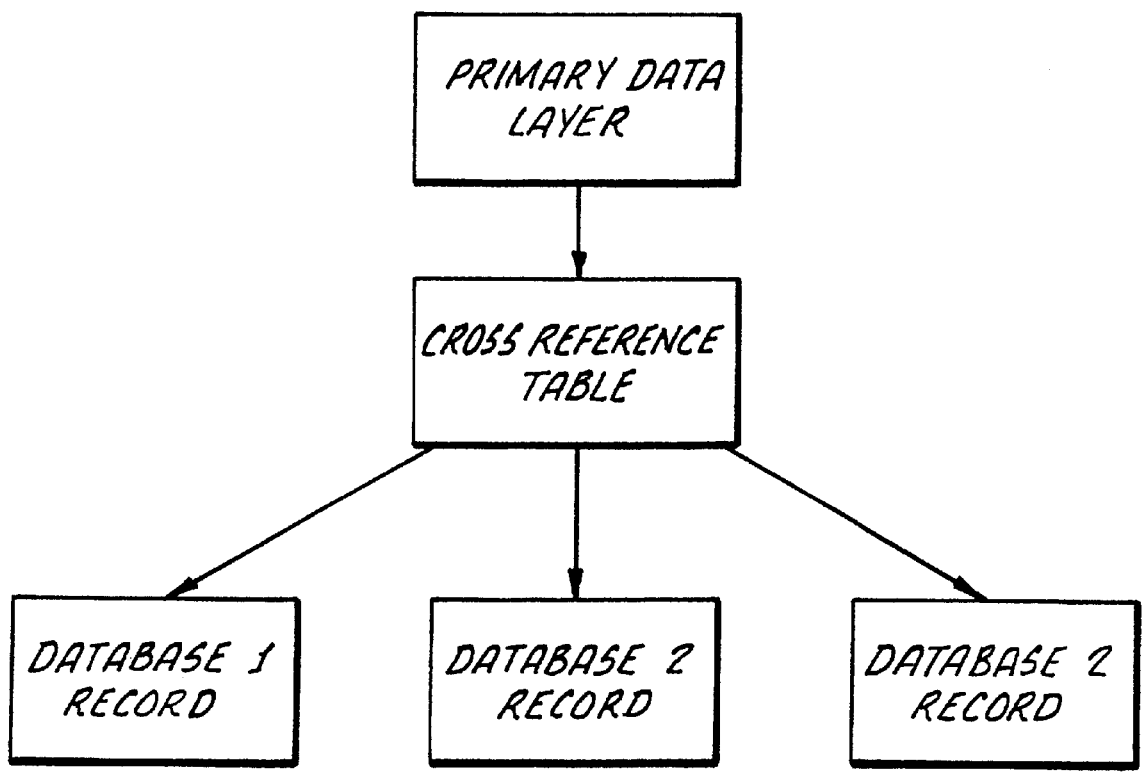
_Fig. 3._

DATABASE CORRELATION METHOD

FIELD OF THE INVENTION

This invention relates to methods and devices for analyzing geological data or other information related to underground formations or zones that may contain oil or other natural resources. More specifically, the invention provides an improved method for correlating formation data stored in several databases.

BACKGROUND OF THE INVENTION

Many sources of location-dependent data and other information related to an underground formation may exist in more than one database, e.g., seismic survey data, satellite or aircraft survey data, water or brine chemistry analysis, temperature survey data, geological analysis of surface outcroppings, core sample analysis, published well data, vendor, contractor, or third party data, and various proprietary well logs. In addition, summaries, abstracts, interpretations, and other full or partial duplications of some information may exist in still other databases. Improved correlation of the information from these distributed and sometimes disparate information sources, including the elimination of duplications, has been a long-term goal of underground formation analysts. Improved correlation should increase the understanding of a formation's properties and help to determine the commercial potential of recoverable natural resources that may exist in the formation. It should also allow less costly drilling and/or other methods for recovering the natural resources in the formation.

However, elimination of duplication and other improvements to correlating location-dependent data can require significant time and money. Eliminating duplication can be difficult when different information identifiers are used for the same data in several databases, e.g., a summary or abstract in database #2 of Wellname no. 1 data in database #1 may be called Fieldname no. 1 data or Wellname-1 data in database #2. In another application, imprecise location information in database #1 may not allow direct correlation with another data set in database #2 that may be more precisely located or whose location information has been altered, e.g., truncated or rounded. In still other applications, the information may be stored in different databases having transposition errors, stored using location information having a different reference point, derived from sources having different levels of precision, stored using different naming standards, or have other differences that make identification of duplication and correlation of the remaining information difficult.

SUMMARY OF THE INVENTION

An algorithm is used in an inventive computer-based method to quickly identify duplicative location-dependent information or other attributes using textual identifiers, location boundaries and/or tolerances. The method allows correlations to be accomplished for location-dependent data and other information with or without precise location information, with or without consistent identifiers, and with or without abstracting or other errors in the data itself. One embodiment of the method determines a bounded area based at least in part on location information and/or location tolerances. The bounded area is compared to the location information of a test attribute in another database (possibly along with comparisons of other information) using a multi-pass algorithm to determine if the test attribute is likely to be duplicative information (e.g., within the bounded area) and, if not, allow correlations with other non-duplicative information. The method may also use location proximity, textual tolerances, confidence levels, and/or other information and factors to select the most correlatable information. The method also allows the option of elevating correlatable information to a higher level database where the information may be further correlated, displayed, or otherwise used.

A preferred embodiment uses concatenated identifiers with one or more PERL multi-pass algorithms to create new index arrays. The algorithm is used to test location and textual name information in the concatenated identifiers (and possibly to also test the numerical value of the data, hierarchy lists and/or other information) to detect duplication between data sets and identify high confidence data that can be accessed by a higher level data layer.

BRIEF DESCRIPTION OF THE DRAWINGS

FIG. 2b shows a Cartesian coordinate surface tolerance around a well;

FIG. 3 shows an original data layer and new layers of data along with a linking of the data layers;

In these Figures, it is to be understood that like reference numerals/identifiers refer to like elements or features.

DETAILED DESCRIPTION OF THE INVENTION

Figure 1:
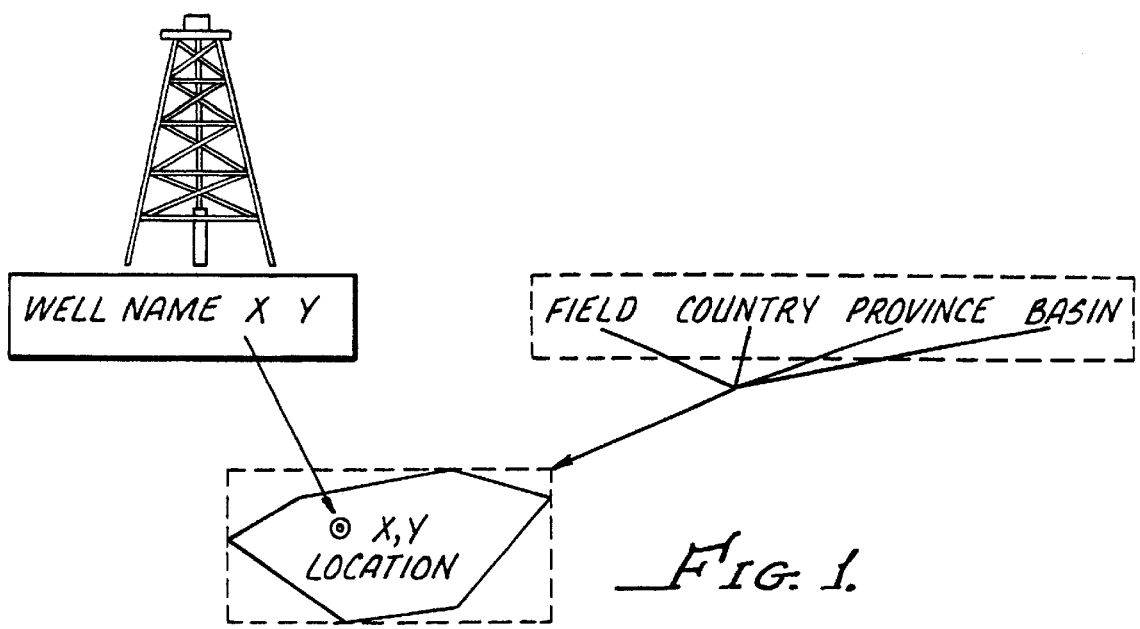
FIG. 1 shows a schematic representation of a specific well location and general locations having bounded areas associated with the well.

FIG. 1 shows a schematic representation of a well having a name or other textual identifier and location-dependent attributes or data. Specifically, the surface location of an oil well identified as "Well_name" having singular X and Y Cartesian coordinates is shown as a dot (enclosed by a small circle for clarity) in FIG. 1. Oil wells are also typically located within one or more general locations having textual location names, such as the name of a specific oil field, country or other political entity, geological province, or basin. Two of the many possible boundaries of named general locations are represented by a range of X and Y Cartesian coordinates (as shown by the dotted rectangular shape around the well) and an irregular general location around the well as shown by a solid line boundary of an irregular shape composed of straight-line segments. Still other location boundaries can be associated with other general location identifiers such as boundaries for a surface tract name, an owner's name of several tracts of land, a well group name or type of well, a stratigraphic zone name, numbers representing well depths for a zone or other values, a prospect name, and/or other location-dependent information related to the data from a well or other location.

When analyzing some of the data or attributes associated with a specifically located well, a preferred embodiment of the inventive method combines a previously existing textual identifier, e.g., Well_name, with the singular X and Y Cartesian coordinates of the well's surface location to form a concatenated identifier. Other data may have general location information that, when converted into location boundaries and combined with the original textual identifier, also create concatenated data identifiers. Still other possible identifiers that may be created with or without surface location or location boundary information, including textual names combined with data-type identifiers, data source identifiers combined with textual names, three dimensional location coordinates instead of only two dimensional surface coordinates, surface tract name or tract owner's name, and/or other information related to the data from a well.

For data having a general location associated with a first well, the preferred embodiment concatenates the associated location boundary defined by Cartesian coordinates with the original textual identifier. This new identifier allows comparisons to be quickly made with data sets from other wells having different textual names and general locations, but possibly overlapping the location boundary of the first well. In addition to the location boundaries, other related information may be combined with the original textual identifier to form a concatenated identifier depending upon the application.

A computer method using the new concatenated identifier with a multi-pass algorithm allows the method to quickly compare textual, location, and other information imbedded within the concatenated identifier. In the simplest application, duplicated data from a well would be identified by finding an identity when comparing concatenated identifiers (e.g., identical names and locations) from two data sets and only one set of data would be selected to be correlated with other data from the well. However, the method can also deal with duplicative data where location boundaries and textual identifier similarities are not sufficient to determine duplication and where the new concatenated identifiers for duplicative data are not identical.

A variety of computer systems can be used to accomplish the inventive method. The computer system used may be a network or a mainframe and the method may be accomplished on the computer system during batch processing or using a continuous process. A variety of data storage devices may also be used in addition to or in conjunction with the computer system.

Tolerances for acceptable dissimilarities in new identifier names, locations, attribute data, or other information are preferably used to eliminate duplicative data having non-identical concatenated identifiers. For example, an attribute datum value in one database containing log data from a well located within a named province can, with high confidence, be considered a duplicate of a similar (i.e., within a tolerance range) attribute datum value from a similarly named well in a named country in another database if the boundaries of the named province overlaps the boundaries of the named country. Besides eliminating duplicative data, tolerances and location boundary information (possibly along with other information) may also be used to identify higher confidence data for selective correlation with data from nearby locations or for other purposes.

In the preferred embodiment, the new combined concatenated identifier containing the textual identifier and location information are among the most important means for determining duplicative and/or correlatable data. Converting general location information into location boundaries is an important step in the process, if required. If not available with the database itself, the location boundaries of a field, province, country, of other textual location information can be input or derived from various other sources, including manual coding from public data sources, scanning from published maps, and OCR information from survey data. As an example of simple Cartesian boundaries for a general location such as the Azi-Aslanova field in the country of Azerbaijan (the existing textual identifier), it may be bounded by a minimum longitude of 50.65577, a maximum longitude of 50.70492, a minimum latitude of 40.27587, and a maximum latitude 40.30879.

The simple type of bounding rectangle defined by a range of Cartesian coordinates associated with a textual identifier is shown as a dotted rectangle in FIG. 1. Other location boundary options for textual or other general location identifiers can include a series of contiguous bounding rectangles more closely approximating a non-rectangular shape associated with a textual location identifier, a mathematically defined curvilinear approximation of an irregular shape, and a series of sub-textual location identifiers correlated to Cartesian coordinates.

Location overlap of data boundaries may be total or partial. For example, the location boundaries of a country textual identifier in one database may totally enclose a small field textual identifier in a second database or only partially cover data in a third database from a larger resource field situated at the country's borders. A large boundary for a textual identifier may also have partial location indicators that allow a better location overlap determination, e.g., field name-north corresponding to locations within country 1 and field name-south corresponding to locations in country 2.

Typically, the more specific the location identifier in terms of Cartesian coordinates, the more confident one can be of the location-dependent attribute values associated with the specific location. However, always placing higher confidence in location specific data can result in problems, e.g., when distributed databases contain duplicates or summarized sets of data and when location, attribute, or other data is altered such as by rounding. In addition, different sources of data at the same specific location may have different levels of precision, for example, different well logs from the same well. Similarly, location overlap between location boundaries is not a certain indicator of duplicative data. Therefore, something more than location precision and/or overlap may be needed to identify high confidence data when comparing or correlating data.

In the preferred embodiment of the invention, eliminating duplicative data is accomplished prior to identifying high confidence (and non-duplicative) data. A multi-pass correlation algorithm first compares similar datum values at overlapping locations within different databases, e.g., comparing abstracts of attribute data recorded in two different databases with truncated location information. If the initial pass or passes suggest possible duplication, subsequent passes can expand the comparison of the concatenated identifiers.

In one type of subsequent pass, special characters, such as name or location textual identifiers, may need to be removed prior to or during some of the comparing steps. For example, a well name may be used as a front-end identifier for one datum point in database 1 while an exploration province may be used as a front-end identifier on the same datum value in database 2. Removal of these different identifiers allows a comparison to show that the datum values are the same or nearly the same, e.g., within a tolerance value of each other.

In still other subsequent passes, special characters may need to be included or the concatenated identifier truncated from other information for other comparisons. For example, a well name (e.g., special characters in the first part of a concatenated identifier) may be used for different wells in different countries (e.g., special characters in the second part of a concatenated identifier) and comparison of the special characters can prevent duplication or the misapplication of well log data from a different country. Alternatively, a cross-reference algorithm or table can be used to identify potentially duplicate entries within a textual tolerance; e.g., name-1 well and name/1 well within the same province would be considered duplicate entries. Comparing special characters may also be combined with the numerical data comparisons (within tolerances) to help identify summaries or abstracts of the same data where the data has been averaged, offset, truncated, or otherwise modified.

Figure 2A:
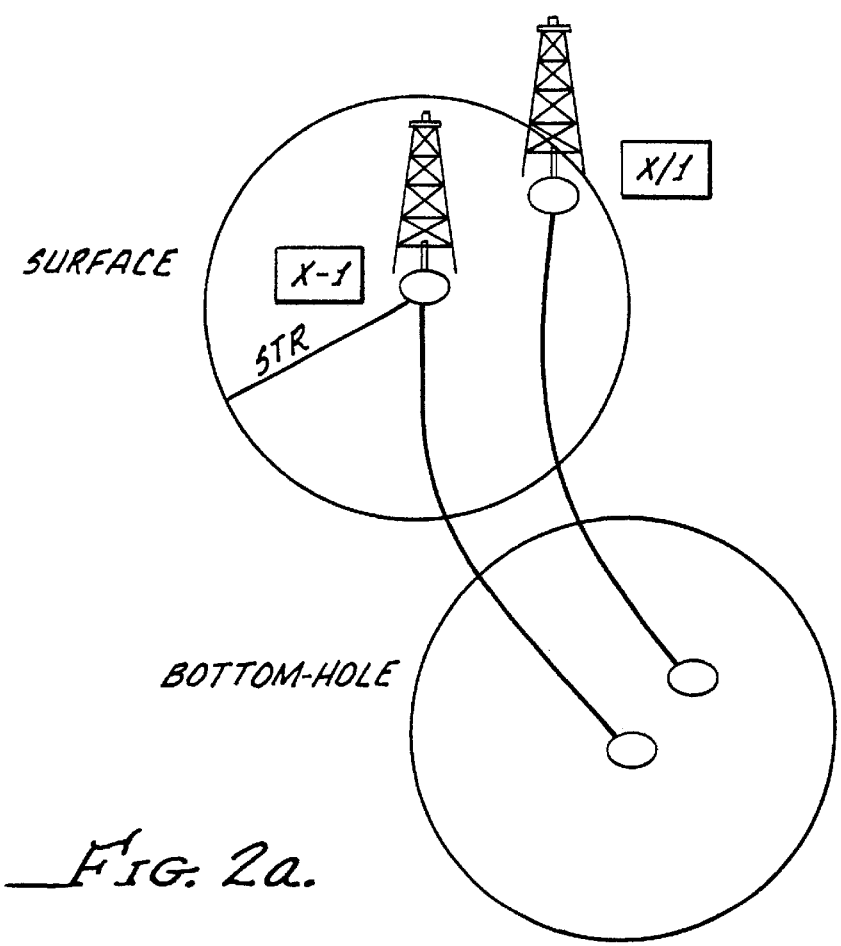
FIG. 2a shows surface radius tolerance around a well location.

In another embodiment of the invention, eliminating duplication and/or correlating data from the same specific location is accomplished by defining a location tolerance around specific location information, such as a Surface Tolerance Radius, STR, as shown in FIG. 2a or rounding the Cartesian coordinates and incrementing and decrementing the rounded coordinates by one as shown in FIG. 2b. If the specific (surface) location information related to a different or test well from a second or disparate database is within an area defined by a nominal STR around the specific location of a first well, the well data from both databases can be assumed to be from the same well with some degree of confidence. Typically, the Surface Tolerance Radius can be as large as about 1,000 feet (304.8 meters) or more, but more typically is less than about 200 feet (60.96 meters), and a high confidence in identical locations is typically achieved if the STR is as small as about 50 feet (15.24 meters) or less. In alternative embodiments, one or more location tolerances may be applied to a downwell location identified in three dimensions, to only a depth, to only one of the two surface dimensions, to a shotpoint interval, to a deviation angle, to a location boundary, or to other location-related information.

Confidence levels are also used in some embodiments to identify data likely to be duplicative and/or to discriminate between non-duplicative data in disparate databases. For example, if attribute data in a first database has a first textual identifier and is located within a location tolerance of attribute data having a different textual identifier from a second database with similar numerical values for the data, a first level of confidence can be assigned to the conclusion that duplicative data are contained in both databases. A higher level of confidence that the data are duplicative can be assigned if the test data also have a similar (i.e., within tolerated textual differences) name identifier. Attribute data tolerances or other individual data-related tolerances or combinations of tolerances can be similarly used to establish comparable levels of confidence or different levels of confidence. Smaller or larger tolerances (e.g., smaller and larger STR's) on each type of tolerance (e.g., a location tolerance) can also be used to establish higher or lower levels of confidence.

In the preferred embodiment for seismic data applications, a confidence rating or level for names has only two values, "High" or "Low." As an example, to achieve a High Confidence rating for duplicative seismic line names, the two line names (in the two databases being compared) must be identical or very similar, e.g., the textual tolerance is limited to differences of only a punctuation mark or a space character. A Low Confidence rating would be assigned for less similar names, e.g., a textual tolerance difference of no more than one or two characters (beyond a punctuation mark or space) such as caused by a typographical input error. Other embodiments can have other levels of confidence and/or use different determinations of high or low confidence.

The process order of correlating and/or comparing name identifiers, location identifiers, attribute value data and other information from different data sets in different databases is not critical, but the preferred embodiment begins with sampling names from a first database, building a new concatenated identifier or Index Value, and determining if the new identifier was previously built from another data set. Specifically, a simple Index Value is preferably built, e.g., by concatenating the original name identifier (e.g., shotpoint line name and number), and the original location information, e.g., surface latitude and longitude. The next step is to check if the built Index Value already exists, e.g., by comparing the Index value to existing Index Values built from previously considered information in other databases. If the built Index Value does not currently exist, the built Index Value is stored for checking subsequent data. If the built Index Value already exists, a Name Match Index is built or supplemented, e.g., a Line Match Index formed by concatenating Line Names. The Name Match Index may then be used to count the number of matched named data points, e.g., matched shotpoints between the two lines.

After looping through all data points in the Name Match portion of the database, the match points per location combination are counted. For example, the number of matched shotpoints per line combination are counted and compared to the total number of shotpoints. In the preferred embodiment, this is accomplished using associative array processing operators in a PERL computing language that allows character string indexes. However, different operators, languages, or still other means for accomplishing these matching steps can be used, including C+ or other object oriented programming languages.

The preferred PERL language steps for comparing shotlines are as follows:

```
While <>
  {$index=join(' : ' , $shot,$x,$y) ;
  if ($Array{$index}eq Null)
  {$Array{$index}=$line__name;
  } else {
$indx__match=join (' : ' $line__name,$Array,$Array{$index}
) ;
$Match__count {$indx__match}++}}
``` where:
  "While" is a modifier controlling the execution of expressions within the statement,
  "<>" is an input stream in an outer loop,
  "$index" is a scalar concatenated index variable,
  "join" combines strings into a single string variable,
  "':'" is a separator,
  "$shot" is a scalar shot name/number variable,
  "$x" is a scalar "x" Cartesian coordinate location,
  "$y" is a scalar "y" Cartesian coordinate location,
  "if" is a conditional operator,
  "$Array" is a scalar name for an index variable,
  "$line__name" is a scalar array of line names,
  "else" is the second part of the "if" operator,
  "$Match__count" is a scalar counter, and
  "++" is an automatic increment.

An outer loop in the preferred embodiment is needed to calculate several possible location values based on a distance tolerance, if one is used. In this outer loop, the specific X and Y coordinate location values are rounded-up as well as rounded-down, producing a maximum of four passes. The ending tolerance window will thus be a square as shown in FIG. 2b, not a circle around the location value using an STR as shown in FIG. 2a.

If the inventive method is applied to seismic data derived from shotpoint locations separated by the same shotpoint interval distance in the field, the interval distance value used in the method need not be set at the field distance in order to compare every shotpoint, but the interval distance used should be consistent for the comparison and matching process to work. A standard linear resample algorithm, e.g., $y=mx+b$, can be used, if necessary, to assure that a matching shotpoint interval is used. Comparing shotpoint interval distances with X and Y location differences (if available) between shotpoints may also detect input location errors.

The matching process using a shotpoint interval distance value significantly greater than the field interval distance value between every shotpoint (e.g., doubling the interval distance used by the algorithm to sample every other shotpoint) is faster than comparing every shotpoint. When combined with an interval distance tolerance, the selected longer interval only compares a portion of the shotpoints, but it still allows duplicates, abstracts or summaries of a data set to be quickly and reliably identified by the computer-based process even when minor data and other errors are present. Other methods of minimizing the number of shotpoints compared for the purpose of identifying duplicative data include random multiples of the field interval, using the field interval for significantly less than all shotpoints, and sampling some shotpoints (separated by a field interval or multiple of the field interval) at each end of the shotlines.

If more than two occurrences of a data set are expected, a "linked list" coding or structure is preferably added to the algorithm shown above. A linked list contains the index of the "next" value to link to. For example, this can be accomplished by storing the "next" value in an array under the current index, e.g., an added PERL code statement equal to or similar to the following:

$Link_list{$current_index}=$next_index;

Based on a selected confidence level or other criteria, a preferred algorithm also determines if a sufficient percentage of matching data has been achieved for that confidence level. For example, if 100 percent or less than 100 percent but at least about 75 percent of the seismic datum points match when comparing two seismic lines of data, an entry is added to a cross-reference table or other means for identifying duplicative data. A matching of at least about 90 percent of the datum points at a specific location is more desirable, i.e., could be given a higher confidence. A matching of at least about 95 or even 99 percent is still more desirable, i.e., still more confidence that the data is duplicative.

The "$indx_match" shown in the PERL code algorithm above allows counting the number of matched points between two lines. By using this algorithm, only indices that are needed are created, and new indices for every possible combination are avoided. The algorithm also counts the number of points for each line to determine the percentage of points that match. Once data from a test seismic line has been correlated to a preexisting data line, comparing the counted number of points can be used to determine partial data sets (e.g., abstracts and summaries) or full duplicates of the same data.

What can be displayed or further used in this example is a cross-reference table or a list that details the duplication of seismic data. The preferred cross-reference list contains the unique identifying fields for both seismic lines.

One preferred embodiment of the inventive process creates a higher level "Knowledge Database" or Meta-data level. The preferred higher level database has links to all of the original data, but can also only select non-duplicative or high confidence data to be correlated, e.g., by avoiding linking to identified partial or full duplicated data By using overlapping location and other information (e.g., confidence levels) with non-duplicated data, the Knowledge Database allows improved analysis and correlation among data sets. Other information useful in correlating the non-duplicated data includes data precision, data sources, and data types. The correlation using the Meta-data level of information will be more reliable because of the elimination of partial data and duplicate data sets, the building of consistent location information instead of general location information, and using higher confidence data.

FIG. 3 illustrates a new higher level or primary level of data that includes a link to other layers. The original data (e.g., database 1 record, database 2 record, and database 3 record) are accessible in a Cross-Reference or integrated database. If the original data are duplicated or partially duplicated (at some level of confidence), only one record or data set of the duplicated data is elevated or linkable to the new primary data layer. In the preferred embodiment, if one database record partially duplicates another, the more complete data set (e.g., the one having the most shotpoints counted) is elevated to the new data layer. If completely duplicated, the selection of a data set to be elevated may be based on a source hierarchy, a confidence level, a random selection or other selecting means.

If a hierarchy process is used, one or more databases having the more valued non-duplicative sources may be elevated and less valued sources not elevated to the new layer. The source hierarchy process can take the form of a source priority list or a hierarchy table, but may also take the form of an algorithm-based process, e.g., selecting a data source depending on the output of an algorithm that identifies the data having the most significant figures. Another example of a process for building a hierarchy based on an algorithm is to calculate a standard deviation for both sets of data and select the data source having the smaller deviation. Another example of a tabular-type source hierarchy process is to select the oldest (or newest) data-creation date.

The preferred cross-reference data table is very simple. The table consists of two columns, one for the name identifier and the other for the field containing the source database. The table may also be a virtual table (e.g., linking to one of the database records or other primary data) or built from the primary data. More complex cross-reference tables can include additional columns of other information, including database location, development status, confidence level, standard deviations, and vendor source.

The information stored in the preferred cross-reference table should at least provide the specific name or identifier of a duplicate data record in another database as well as the name or textual identifier of the elevated data or data set. An example record in a cross-reference table is as follows:

Database_name: Iris
Unique_id: 10000234567
Database_name_alias: IDES
Unique_id_alias: 602000012345
Confidence Rating: 1

One preferred process of creating a new or Primary Data Layer shown in FIG. 3 pulls data from several databases, builds a cross-reference table and uses a source hierarchy to elevate non-duplicative data to the new data layer. The cross-reference table is built primarily using similarities in location and name information from compared databases. As discussed above, comparing location-related information (e.g., location coordinates, boundaries, overlaps, intervals, and proximity) and location tolerances are preferably an important factor for determining duplication and correlation. Name similarities or textual tolerances can limit consideration to close or nearly identical textual name/number identifiers. A different set of data, name, and location hierarchy can be used when more than one similarity is present, e.g., a location identity (or within location tolerances) plus nearly identical number identifiers plus a high percentage of data value matches can be considered duplicative without regard to errors or differences in textual shot line names.

The preferred process also allows selection and/or changes and overrides of many process portions or factors such as temporary boundary location changes, altered confidence levels or no confidence levels, altered hierarchy lists and various duplication detection and/or correlation criteria. Other inputs may allow still other overrides or changes of other parameters depending upon the application.

A variety of devices and methods are available for displaying the correlatable data residing in the new Primary Data Layer. This can include algorithms, plotters, graphics software or other means to display correlated data as 2D or 3D maps, schematics, stratigraphic traps, identify likely hydrocarbon deposits, or print tabular reports.

The inventive process has several benefits. The primary benefit is reducing the cost and amount of manual manipulation of data by quickly identifying and/or eliminating duplicative data from further consideration. Other benefits can include the ability to access all or only high confidence data in a single database, providing consistent location information to correlate only non-duplicative data and high confidence data, identifying "holes" in the data or "missing" data between two or more data sets in different databases, tracking data enhancements, and/or comparing the precision and other confidence measures from various data sources. The invention also allows improved workflow, data storage, data recovery, data transport, and data assembly or disassembly. Further advantages of the invention include improved predictive reliability, recovery, and preservation of data versioning.

Figure 4:
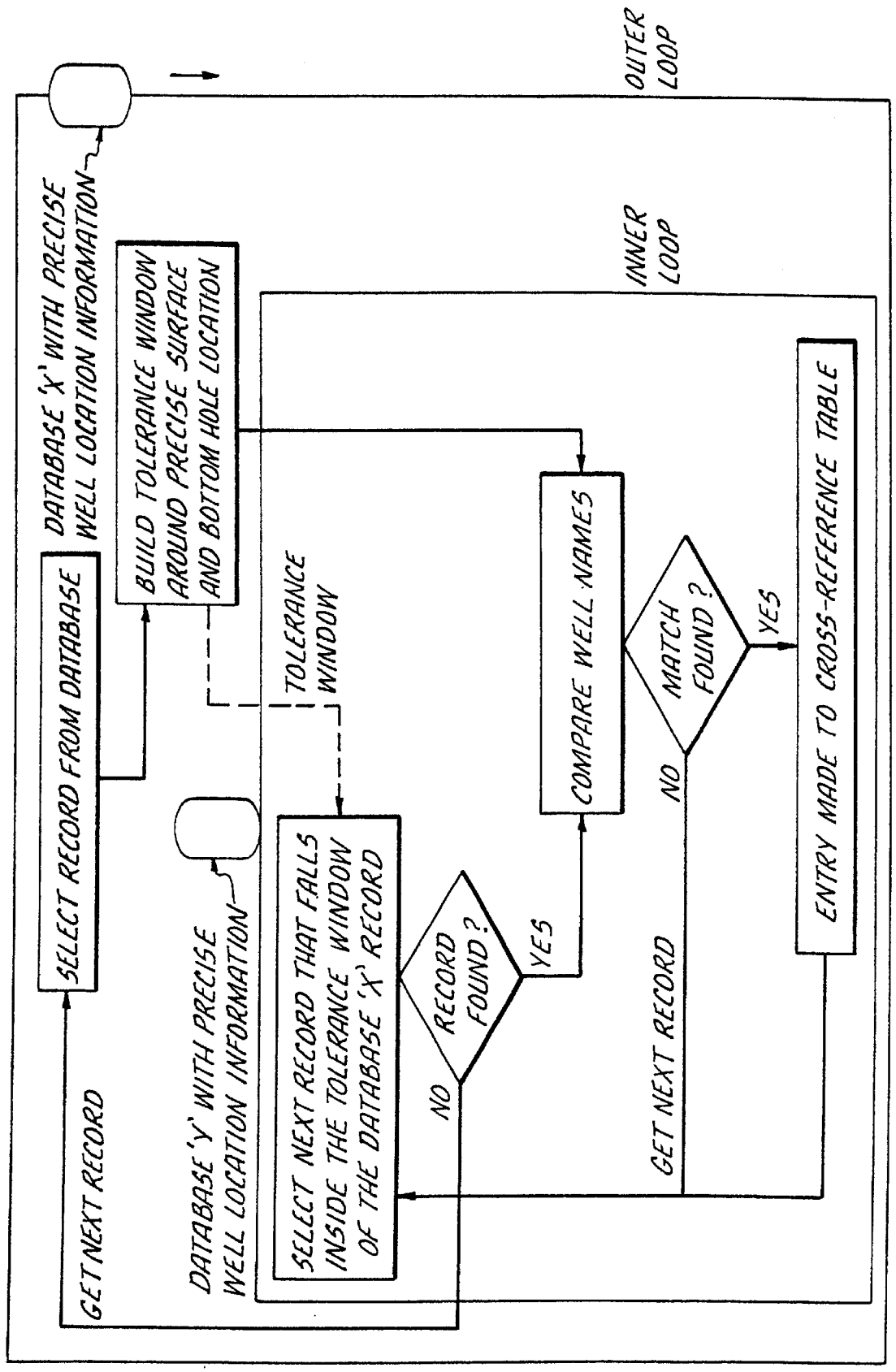
FIG. 4 shows a flow chart for correlating attribute data in two databases both having precise location information.

FIG. 4 is a flow chart of an inventive process embodiment comparing an attribute from two databases having singular point or specific location information. The process flow transitions from an outer loop to an inner loop using a location tolerance window and, if the compared data from the second database is within a location tolerance window of the data from the first database, well names are compared. If a match within a textual tolerance is found, an entry is made into the cross-reference table. If no match is found, another data record is compared to the data from the first database.

Figure 5:
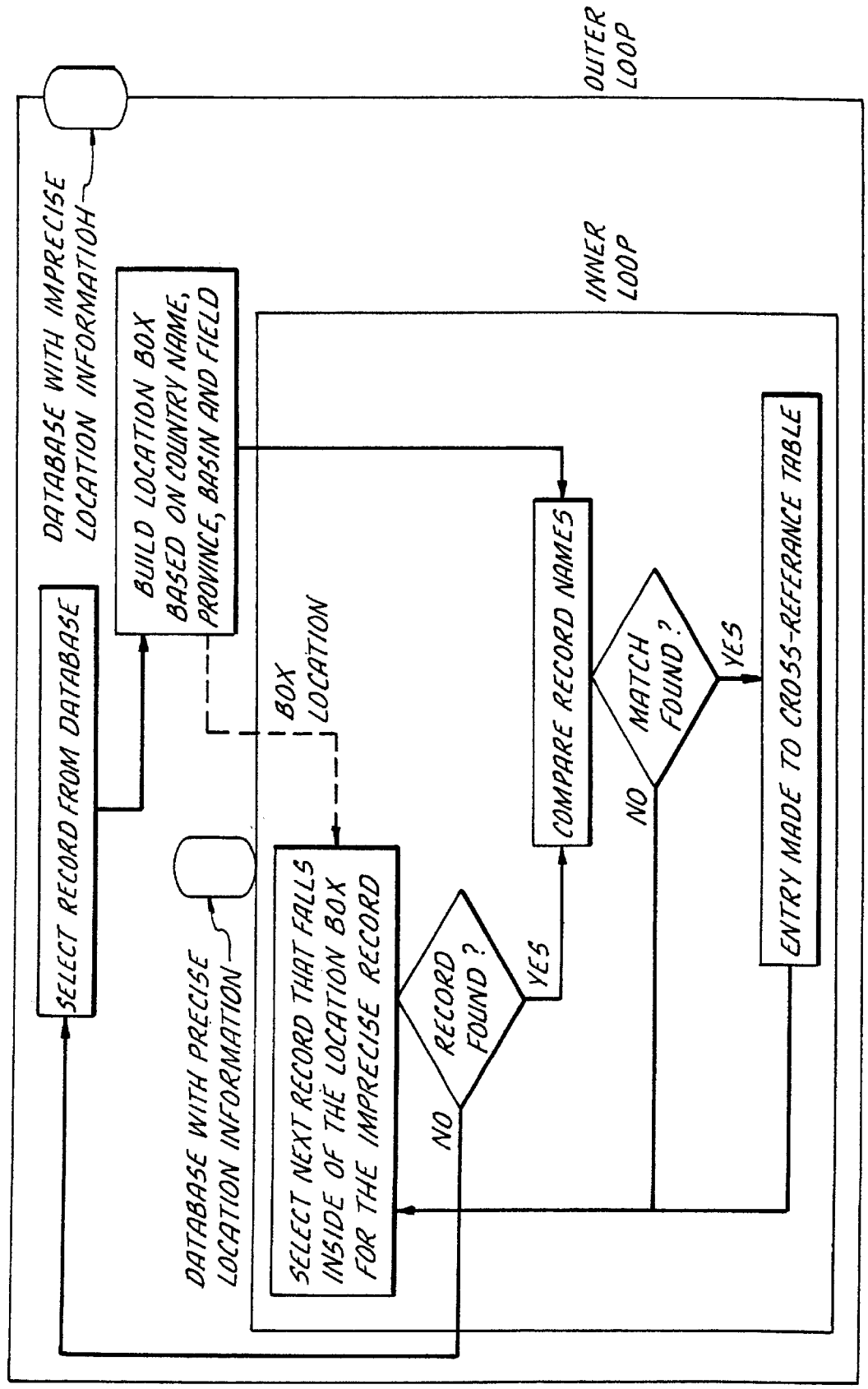
FIG. 5 shows a flow chart for correlating attribute data in a database having precise location information with data in another database having imprecise location information.

FIG. 5 shows a flow chart of a process comparing an attribute from one database having relatively precise location information with attribute data in another database having imprecise or general location information. The flow chart shows the process transitioning from an outer loop using a location box or other surface area boundary and, if the compared data is within the boundary, comparing the record names or textual identifiers. If a textual match within a textual tolerance is found, an entry is made into the cross-reference table. If no match is found, another attribute record is compared.

Figure 6:
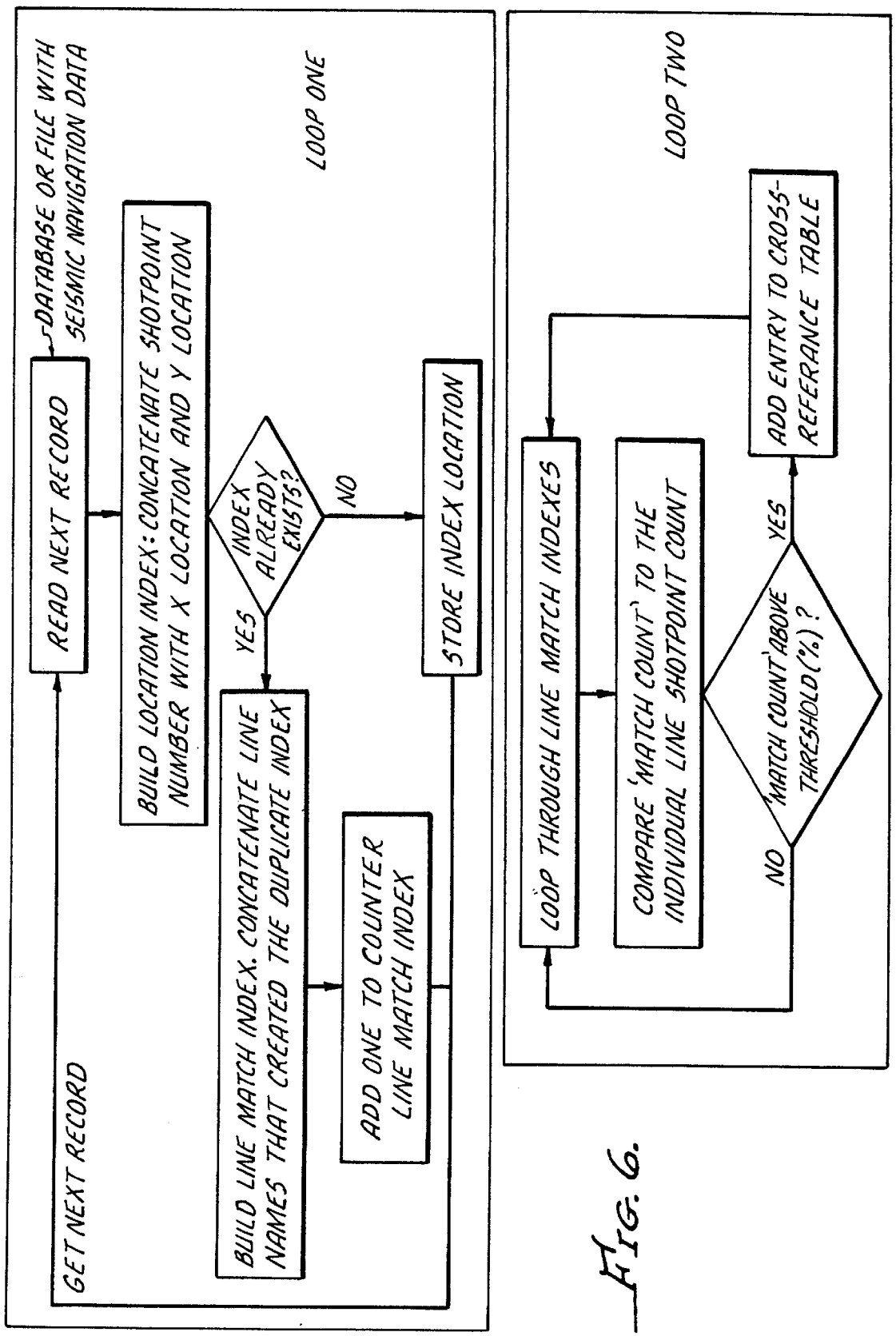
FIG. 6 shows a flow chart for correlating seismic navigation information.

FIG. 6 shows a flow chart for a two-loop process embodiment that compares seismic navigation data. In the first loop, a location index value is built from a data record if the index value doesn't already exist (within one or more tolerances) and a line match index is incremented as previously discussed. In the second loop, the line match index is compared to the line shotpoint count. If the comparison is above a threshold value, the entry is added to a cross-reference table.

Still other alternative embodiments are possible. These include: additional loops, a plurality of higher level databases, e.g., having successively higher levels of confidence; incorporating some primary data directly into a higher level database; and limiting access to one or more databases.

Although the preferred embodiment and some alternative embodiments of the invention have been shown and described, changes and modifications may be made thereto without departing from the invention. Accordingly, it is intended to embrace within the invention all such changes, modifications and alternative embodiments as fall within the spirit and scope of the appended claims.

What is claimed is:

1. A method for correlating a first location-dependant attribute of an underground reservoir in a first database to a second location-dependant attribute in a second database, said method comprising:

a. determining a first location for said first attribute;

b. determining a second location for said second attribute;

c. comparing said locations using an algorithm;

d. determining said location-dependant attributes as at least partial duplications of each other if said locations are at least in part within a location tolerance; and e. drilling into said underground reservoir.

2. The method of claim 1 wherein said second location at least in part overlaps said first location.

3. The method of claim 2 wherein said second location defines a bounded surface area.

4. The method of claim 3 wherein said bounded surface area is defined by Cartesian coordinates.

5. The method of claim 4 wherein said bounded surface area is defined by latitude and longitude values.

6. The method of claim 5 wherein said attributes have textual names, said method also comprising the steps of:

f. comparing a first textual name with a second textual name; and g. considering said attributes as at least partial duplicates if said textual names differ by no more than a first textual tolerance.

7. The method of claim 6 wherein at least one of said textual names is a portion of a concatenated term that also includes location information.

8. The method of claim 7 wherein a confidence level is assigned to said attributes based on a location tolerance and a textual tolerance.

9. The method of claim 8 wherein the step of considering said attributes as at least partial duplicates is accomplished at a first confidence level.

10. A method for determining whether a first attribute in a first database is at least a partial duplication of a second attribute in a second database, said method comprising:

a. determining a first identifier for said first attribute;

b. determining a second identifier for said second attribute;

c. comparing at least in part said first and second identifiers using a multi-pass algorithm; and d. determining that said second attribute is at least a partial duplicate of said first attribute if said second identifier is within a tolerance value of said first identifier.

11. The method of claim 10 wherein said first and second identifiers include location identifiers.

12. The method of claim 11 wherein said first and second identifiers also include textual identifiers.

13. The method of claim 12 wherein said tolerance value at least in part determines if the first and second attributes are full or partial duplicates when differences in textual identifiers are present.

14. The method of claim 13 wherein said tolerance value at least in part determines if the first and second attributes are full or partial duplicates when differences in location identifiers are present.

15. The method of claim 14 wherein said algorithm is expressed in an object oriented programming language.

16. The method of claim 15 wherein said algorithm is expressed in PERL.

17. A method for determining whether a first data point in a first database is not likely to be a duplication of a second data point in a second database, said method comprising:

a. building a first concatenated identifier for said first data point by concatenating at least a first textual identifier with a first location identifier for said data point;
   b. comparing said first concatenated identifier to similar concatenated identifiers derived from a second database; and
   c. if said first concatenated identifier is not within a tolerance of at least one of said concatenated identifiers derived from a second database, storing said first concatenated identifier.

18. The method of claim 17 which also comprises the steps of:

d. if said first concatenated identifier is within a tolerance of said identifiers derived from
   a second database, building a match index; and
   e. counting the number of matched data points.

19. The method of claim 18 which also comprises the steps of:

f. comparing said number of matched data points with a number of data points having similar identifiers in each database; and
   g. selecting correlatable data points from either said first or second database depending at least in part on the step of comparing said number of matched data points.

20. The method of claim 19 wherein said comparing step f finds less than 100 percent matching data points, but at least about 75 percent matching data at locations where data points exist.

21. The method of claim 20 which also comprises the steps of:

h. building a cross-reference table; and
   i. identifying a textual identifier as duplicative.

22. A method for determining whether a first location-dependant data point at a first location having a first textual identifier is a likely duplication of a test location-dependant data point at a test location having a test textual identifier, said method comprising:

a. determining a location tolerance around said first location;
   b. determining a textual tolerance associated with said first location-dependant data point;
   c. comparing said test location with said location tolerance;
   d. comparing said test textual identifier with said textual tolerance;
   e. if said comparisons show location and textual identifiers outside the respective tolerances, storing said test data point; and
   f. if said comparisons show location and textual identifiers within the respective tolerances, handling said test data point as duplicative of said first data point.

23. The method of claim 22 wherein at least one of the tolerances allows no differences.

24. The method of claim 23 which also comprises the steps of g. repeating steps a–f for other location-dependent test data points;
   h. counting the number of test data points and the number of stored data points;
   i. comparing the number of test data points with the number of stored data points; and
   j. if the comparison shows at least 95% of said test data points as likely to be duplicative, handling all data points having a similar textual identifier as duplicative.

25. The method of claim 24 wherein said location tolerance is no more than 100 feet.

26. The method of claim 25 wherein said textual tolerance is a difference of no more than 2 characters.

27. A method for determining whether a first series of location-dependant data values is a likely duplication of a second series of location-dependent data values wherein both of said series of data values are taken at locations separated by similar distance intervals, said method comprising:

a. building a first concatenated identifier of a portion of said first series of data values wherein said concatenated identifier includes a textual identifier and location information;
   b. building a second concatenated identifier of less than all of the second series of data values;
   c. comparing said concatenated identifiers; and
   d. if said comparing shows similar location and textual identifiers, determining that one of said series of data values is duplicative of the other series of data values.

28. A computer-based device for determining whether a first series of location-dependant data values is a likely duplication of a second series of location-dependent data values wherein both of said series of data are taken at locations separated by similar distance intervals, wherein said device is capable of:

a. building a first concatenated identifier of a portion of said first series of data values wherein said concatenated identifier includes a textual identifier and location information;
   b. building a second concatenated identifier of less than all of the second series of data values;
   c. comparing said concatenated identifiers; and
   d. if said comparing shows similar location and textual identifiers, determining that one of said series of data values as duplicative of the other series of data values.

29. A method for correlating a first location-dependant attribute of an underground reservoir in a first database to a second location-dependant attribute in a second database, said method comprising:

a. determining a first underground location associated with a first value of said first attribute;

b. determining a second underground location associated with a second value of said second attribute;

c. comparing said locations using an algorithm;

d. determining said first and second values as at least a partial data duplication of each other if said locations are within a location tolerance;

e. analyzing at least some of said database values in the absence of at least one of said values determined to be at least a partial data duplication; and f. drilling into said underground reservoir based at least in part on said analyzing.

* * * * *